United States Patent [19]

Hrycik et al.

[11] 4,161,617
[45] Jul. 17, 1979

[54] METHOD AND APPARATUS FOR ELECTRICALLY MELTING GLASS

[75] Inventors: Kenneth S. Hrycik, Eastlake; John H. Leonhardt, Euclid; William J. Prentice, Jr., South Euclid, all of Ohio

[73] Assignee: General Electric Company, Schenectady, N.Y.

[21] Appl. No.: 901,315

[22] Filed: May 1, 1978

[51] Int. Cl.² .............................................. C03B 5/02
[52] U.S. Cl. ......................................................... 13/6
[58] Field of Search ........................................ 13/6, 23

[56] References Cited

U.S. PATENT DOCUMENTS

| | | | |
|---|---|---|---|
| 2,773,111 | 12/1956 | Arbeit et al. | 13/6 |
| 3,524,206 | 8/1970 | Boettner et al. | 13/6 |
| 3,583,861 | 6/1971 | Preston | 13/6 X |
| 3,636,227 | 1/1972 | McQuaid | 13/6 |
| 3,742,111 | 6/1973 | Pieper | 13/6 |
| 3,852,509 | 12/1974 | Rutledge et al. | 13/6 |

*Primary Examiner*—R. N. Envall, Jr.

*Attorney, Agent, or Firm*—John F. McDevitt; Lawrence R. Kempton; Frank L. Neuhauser

[57] ABSTRACT

A method and apparatus is described for melting of a glass batch with electrical energy supplied by electrodes disposed in a vertically oriented melting chamber and which ameliorates the problems encountered when the raw batch blanket cannot be continuously and uniformly melted in said chamber. Specifically, improved electrode heating means are provided to generate localized hot spots in the molten glass adjacent the underside of the batch blanket and cause a flow of gas bubbles upwardly through the glass at the hot spot locations for escape through the batch blanket. The electrical energy rate supplied to said electrode means is also controlled so that a crust of only partially melted foam-type glass material is not formed within the batch blanket to impede escape of the gas bubbles. The improved system can further include cooperative means to refine the molten glass being continuously withdrawn from the bottom of the melting chamber in a separate refining chamber connected thereto.

12 Claims, 1 Drawing Figure

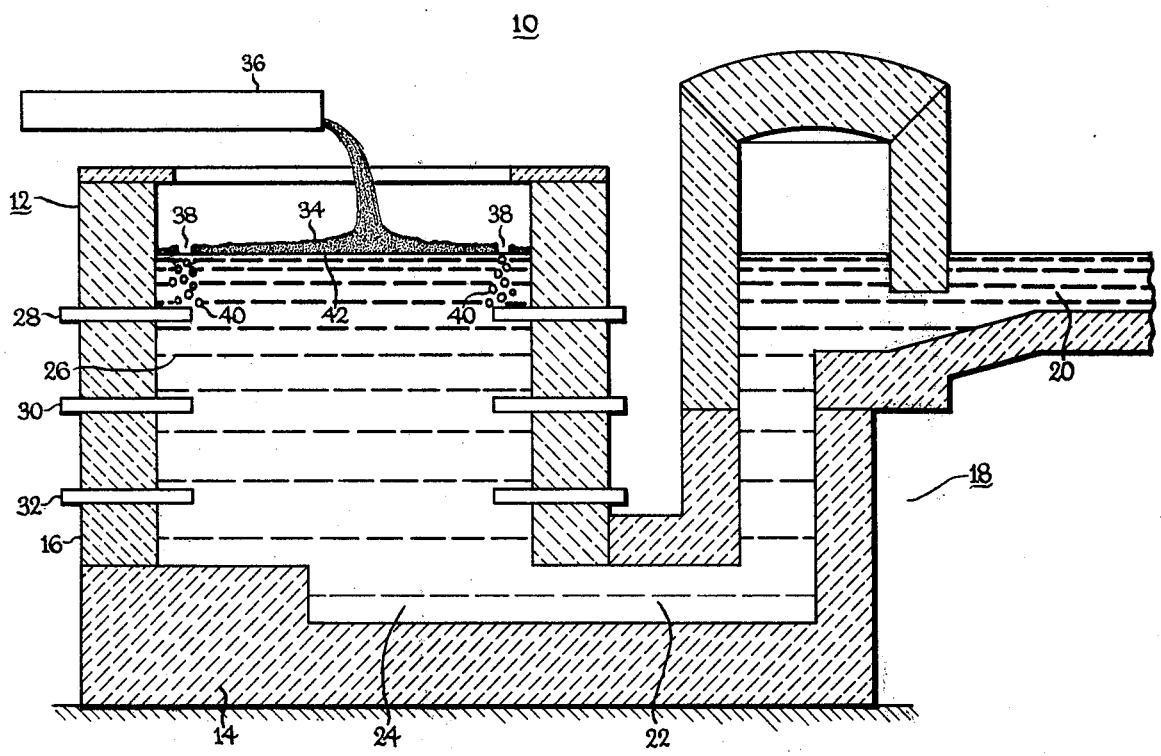

METHOD AND APPARATUS FOR ELECTRICALLY MELTING GLASS

CROSS REFERENCE TO RELATED APPLICATION

In co-pending patent application Ser. No. 901,318, filed concurrently herewith and assigned to the assignee of the present invention, there is described a related electric melting glass furnace. Said glass furnace can further be operated in accordance with the present invention.

BACKGROUND OF THE INVENTION

In the conventional electric glass melting process utilizing a vertically oriented melting chamber formed of conventional refractory materials, the glass batch is fed continuously at the top level of the melting chamber and molten glass is withdrawn also continuously at the bottom level of the chamber generally after the molten glass has been refined. Batch feeding means supply the glass batch to form a blanket extending partially or completely over the entire cross sectional area of the melting chamber which floats on the top of the molten glass in the chamber. This floating layer of batch blanket consists of powdered materials which exhibit a sufficiently low thermal conductivity to function as an insulator with respect to the electrical heating energy being supplied to the furnace electrodes. Various type electrode arrangements to supply the heating energy for melting the glass batch are known and generally include sets of individual electrodes which project into the melting chamber through the refractory sidewalls and are disposed at different elevations in the molten glass zone. It is known to locate one set of heating electrodes at the upper level of the molten glass zone and to further include at least one set of electrodes located therebelow in the molten glass having separate control means for applying electrical energy to each set of electrodes.

For high thermal efficiency in the above type glass melting process, it is desirable to maintain the batch blanket as thick as possible. However, the gaseous products which evolve from the glass batch must escape upwardly through the batch blanket if the glass batch is to be melted continuously in an uninterrupted manner. More particularly, if the gaseous products are trapped within or beneath the glass batch blanket, a phenomena wherein only partial melting of powdered materials occurs which can interrupt or terminate the continuous glass melting process. When these gaseous products cannot escape, a layer of foamy glass is formed within the batch blanket that can be sufficient to cause sudden lifting of the entire batch blanket as much as six inches in as short a time period as 15 minutes. The undesired layer of foamy glass itself forms an insulation preventing heat from the underlying electrodes to melt the batch blanket and can further undesirably elevate the temperature of the molten glass. The molten glass level can also drop when this phenomena takes place. Such accompanying effect cannot only disrupt the continuous glass melting operation but further produce undesired variations while the molten glass is still being withdrawn from the melting chamber. Certain means are already known to help avoid interruption of the continuous glass melting process due to entrapment of gas products from the glass batch, but the known means either sacrifice operating efficiency or have not proven entirely reliable. One method proposed to solve the problems encountered with gas entrapment in this manner utilizes physical dimensions and operating conditions in the melting chamber so that a batch blanket less than approximately six inches in thickness is maintained but such operation results in excessive heat loss and reduced thermal efficiency. The melting chamber has also been modified to include an overhanging tuckstone arrangement being located at the level where the batch blanket is deposited in an attempt to maintain a ring of molten glass through which the gases can escape. Although such arrangement permits maintenance of a batch blanket having 8–16 inches thickness, it has been found sensitive to changes in power input or batch charging rates sufficient to cause the undesired bridging condition above explained. Still different means to alleviate the general problem employs a rotating mechanical device to preserve an opening in the batch blanket for gas escape but this means introduces further complexity in the glass melting process and is also subject to the same undesirable bridging condition.

SUMMARY OF THE INVENTION

It has now been discovered, surprisingly, that proper disposition of one set of electrodes in the molten glass together with a particular operation of these electrodes during the continuous glass melting process above defined can alleviate gas entrapment in an efficient and reliable manner not requiring additional structural modification of the melting chamber or sacrificing thermal efficiency during glass melting to any significant degree. Specifically, reliable degasification of the molten glass is accomplished with a plurality of electrodes disposed in the vertically oriented melting chamber by having a set of electrodes located in the upper level of the melting chamber sufficiently close to the underside of the raw batch blanket to generate localized hot spots in the molten glass adjacent to said electrodes and cause a flow of gas bubbles upwardly through the molten glass at the hot spot locations for escape of the gas bubbles through the batch blanket.

Immersion of an upper set of electrodes in the molten glass at an elevation level only about six inches below the underside of the raw batch blanket which floats on top of the molten glass has been found effective in maintaining a batch blanket ranging between 12–16 inches in thickness elsewhere than directly above these electrodes. That a proper location of the top set of electrodes in the melting chamber permits degasification of the molten glass in the manner defined can be demonstrated from observations made during the glass melting process wherein volcanic type eruptions are observed in the top surface of the batch blanket corresponding to spatial location of the individual electrodes in the uppermost set of electrodes. While the temperature of the molten glass at the aforementioned hot spot locations will vary depending upon the particular glass composition being melted as well as other factors, temperature measurements carried out while melting one specific borosilicate glass batch indicate a glass temperature of approximately 1300° C. at the hot spot locations so as to produce a low enough viscosity in this molten glass permitting escape of the glass bubble through the molten material. In the preferred method and glass furnace construction further described below, the molten glass is refined in a separate refractory chamber connected at the bottom level of the melting chamber and which further includes auxiliary electrodes to control the refining temperature.

Accordingly, the preferred glass furnace construction for continuously melting the glass batch by heating with electrodes includes:

(a) a vertically oriented melting chamber to feed glass batch to top level of the chamber and withdraw molten glass at the bottom of the chamber, (b) batch feeding means to supply batch at the top level in the chamber to form a blanket extending over substantially the entire cross-sectional area of said chamber and with said batch blanket resting on the molten glass, (c) a set of electrodes disposed at the top level of the chamber and spaced circumferentially to generate hot spots in the molten glass adjacent the underside of the batch blanket, (d) at least one additional set of electrodes disposed at a lower level in the chamber with the individual electrodes being aligned in a vertical direction with the individual electrodes at the top level, and (e) separate control means for applying electrical energy to each set of electrodes. Operation of the above preferred glass furnace construction for continuous melting of a borosilicate type glass batch requires supplying electrical energy to said lower level electrodes at a rate sufficient to supply molten glass continuously at the bottom level of the melting chamber while supplying electrical energy to the top level electrodes at a rate sufficient to generate localized hot spots in the molten glass adjacent said electrodes in the temperature range from about 1250° C. to about 1350° C. and cause a flow of gas bubbles upwardly through the glass at said hot spot locations for escape through the batch blanket. The energy rate being supplied to said upper set of electrodes is also maintained at a level less than would reduce the thickness of the batch blanket for optimum thermal efficiency. The disposition of lower electrodes in the preferred furnace construction further includes a first set of electrodes located at the bottom level of the melting chamber which cooperate with a second set of electrodes located at a level in the melting chamber intermediate said bottom level electrodes and the top level electrodes and with each first and second set of lower electrodes being supplied from separate electrical energy sources to maintain the molten glass temperature greatest in the zone adjacent said intermediate level electrodes. All electrodes at the top, intermediate and bottom levels of the melting chamber project through the refractory walls of the melting chamber in a radially oriented spaced apart disposition at each elevation level in the melting chamber and can be further oriented with respect to individual electrodes at higher and lower elevation levels so that individual electrodes lie in the same vertical plane.

BRIEF DESCRIPTION OF THE DRAWING

The accompanying FIGURE is a vertical section through one electric melting furnace construction which embodies the electrode heating means of the present invention.

DESCRIPTION OF THE PREFERRED EMBODIMENTS

Referring now to the accompanying drawing, there is shown in cross section a vertically oriented electric glass melting furnace construction 10 having a melting chamber 12 defined by a refractory bottom 14 and sidewalls 16, to provide a horizontal configuration which can be polygonal or circular in shape, said furnace construction further including a refining chamber 18 which leads to an otherwise conventional forehearth arrangement 20. As can be noted from said FIGURE, the refining chamber 18 is operatively connected to the melting chamber 12 by a throat section 22 which withdraws molten glass from the bottom level 24 of the melting chamber. The molten glass 26 in the melting chamber 12 has immersed therein three sets of electrodes 28, 30 and 32 that supply electrical heating energy for melting a raw glass batch blanket 34 which lies on top of the molten glass. Continuous feeder means 36 located at the top level of the melting chamber produce a glass batch blanket extending over substantially the entire cross-sectional area of said melting chamber. As is further shown in said FIGURE, gas vent openings 38 are formed in the glass batch blanket 34 during the melting process to permit escape of gas bubbles 40 which rise upwardly through the molten glass in the vicinity of the upper set of electrodes 28. Conventional electrical power supply means (not shown) are separately connected to the circumferentially spaced electrodes at each elevation level in the melting chamber and controlled in a known manner to provide the heating energy required for continuous uniform melting of the glass batch. Also not shown are auxiliary electrode means which can be disposed in the refining chamber 18 and controlled to maintain a uniform temperature in the molten glass.

In operation, the uppermost set of electrodes 28 are supplied with electrical energy at a rate sufficient to generate localized hot spots in the molten glass adjacent said electrodes and cause the upward flow of gas bubbles through the glass at said hot spot locations for escape through the batch blanket. It is also preferred to supply electrical energy to the intermediate set of electrodes 30 at an energy rate which retains the molten glass temperature greatest in the zone adjacent said intermediate level electrodes. The electrical energy rate being supplied to the bottom level electrodes 32 in the melting chamber can be controlled and maintained to provide a glass temperature suitable for subsequent refining and/or conditioning.

As will be apparent in the foregoing construction, a generally useful improvement for continuous melting of glass batch in a vertically oriented furnace and heated entirely with electrical energy has been provided. It will be apparent to those skilled in the art that the operation of electrode heating means according to the present invention will prove beneficial in other vertically oriented electric glass furnaces which do not include a separate refining chamber. For example, all electric furnace constructions are known wherein the glass batch is both melted and refined in the same melting chamber before removal therefrom. It is contemplated, therefore, to limit the present invention only by the scope of the following claims.

What we claim as new and desire to secure by United States Letters Patent is:

1. A process for continuously melting a glass batch by heating said glass batch in a furnace having plurality of electrodes disposed in a vertically oriented melting chamber to feed said glass batch at the top level of the chamber and withdraw molten glass at the bottom level of the chamber and further including one set of electrodes located adjacent the top level of the chamber with at least one other set of electrodes located at a lower level of the chamber which comprises:

(a) feeding said glass batch continuously at the top level of the chamber to form a blanket resting on the molten glass, (b) supplying electrical energy to said lower level electrodes at a rate sufficient to supply molten glass continuously at the bottom level of the chamber, and (c) supplying electrical energy to said top level electrodes at a rate sufficient to maintain the batch blanket at relatively constant thickness while generating localized hot spots in the molten glass adjacent said electrodes and causing a flow of gas bubbles upwardly through the glass at said hot spot locations for escape through the batch blanket.

2. A process as in claim 1 wherein said lower level electrodes comprise a first set of electrodes located at the bottom level of the chamber which cooperate with a second set of electrodes located at the level intermediate said bottom level electrodes and the top level electrodes to maintain the molten glass temperature greatest in the zone adjacent said intermediate level electrodes.

3. A process as in claim 1 wherein the molten glass is refined after removal from the melting chamber.

4. A process as in claim 3 wherein refining of the molten glass takes place in a refining zone connected to the melting chamber which further includes auxiliary electrodes to control the refining temperature.

5. A process for continuous melting a borosilicate glass batch by heating said glass batch in a furnace having a plurality of electrodes disposed in a vertically oriented melting chamber to feed said glass batch at the top level of the chamber and withdraw molten glass at the bottom level of the chamber and further including one set of electrodes located adjacent the top level of the chamber with at least one other set of electrodes located at a lower level in said chamber which comprises:

(a) feeding said glass batch continuously at the top level of the chamber to form a blanket extending over substantially the entire cross sectional area of said chamber and resting on the molten glass, (b) supplying electrical energy to said lower level electrodes at a rate sufficient to supply molten glass continuously at the bottom level of the chamber, and (c) supplying electrical energy to said top level electrodes at a rate sufficient to maintain the batch blanket at relatively constant thickness while generating localized hot spots in the molten glass adjacent said electrodes in the temperature range from about 1250° C. to about 1350° C. and causing a flow of gas bubbles upwardly through the glass at said hot spot locations for escape through the batch blanket.

6. A process as in claim 5 wherein said lower level electrodes comprise a first set of electrodes located at the bottom level of the chamber which cooperate with a second set of electrodes located at the level intermediate said bottom level electrodes and the top level electrodes to maintain the molten glass temperature greatest in the zone adjacent said intermediate level electrodes.

7. A process as in claim 5 wherein the molten glass is refined after removal from the melting chamber.

8. A process as in claim 7 wherein refining of the molten glass takes place in a refining zone connected to the melting chamber which further includes auxiliary electrodes to control the refining temperature.

9. A furnace construction for continuously melting a glass batch by heating with electrodes which comprises:

(a) a vertically oriented melting chamber to feed glass batch at the top level of the chamber and withdraw molten glass at the bottom level of the chamber, (b) batch feeding means to supply batch at the top level of the chamber to form a blanket extending over substantially the entire cross sectional area of said chamber and rest on the molten glass, (c) a set of electrodes disposed at the top level of the chamber and space circumferentially to maintain the batch blanket at relatively constant thickness while generating hot spots in the molten glass adjacent the underside of the batch blanket, (d) at least one additional set of electrodes disposed at a lower level in the chamber with the individual electrodes being aligned in a vertical direction with the individual electrodes at the top level, and (e) separate control means for applying electrical energy to each set of electrodes.

10. A furnace construction as in claim 9 which further includes another set of electrodes spaced circumferentially at the bottom level of the chamber.

11. A furnace construction as in claim 9 which further includes a separate refining chamber connected to the bottom level of the melting chamber.

12. A furnace construction as in claim 11, having auxiliary electrodes disposed in the refining chamber.

* * * * *